United States Patent
Kaneko

(10) Patent No.: US 7,822,618 B2
(45) Date of Patent: Oct. 26, 2010

(54) HOME DELIVERY BOX AND HOME DELIVERY BAGGAGE COLLECTING/DELIVERING SYSTEM AND METHOD THEREFOR

(76) Inventor: Kikuo Kaneko, 1-15, Kamiyoga 6-Chome, Setagaya-Ku, Tokyo 158-0098 (JP)

( * ) Notice: Subject to any disclaimer, the term of this patent is extended or adjusted under 35 U.S.C. 154(b) by 1685 days.

(21) Appl. No.: 10/476,464

(22) PCT Filed: Jun. 11, 2002

(86) PCT No.: PCT/JP02/05794
§ 371 (c)(1),
(2), (4) Date: Apr. 12, 2004

(87) PCT Pub. No.: WO02/101181
PCT Pub. Date: Dec. 19, 2002

(65) Prior Publication Data
US 2004/0181570 A1    Sep. 16, 2004

(30) Foreign Application Priority Data
Jun. 12, 2001    (JP) .............................. 2001-176564

(51) Int. Cl.
*G06Q 99/00* (2006.01)
(52) U.S. Cl. ............................................ 705/1; 705/50
(58) Field of Classification Search .................. 705/1–2
See application file for complete search history.

(56) References Cited

U.S. PATENT DOCUMENTS

| | | | |
|---|---|---|---|
| 6,036,348 A * | 3/2000 | Miura | 700/225 |
| 2002/0032572 A1 * | 3/2002 | Ikemori et al. | 705/1 |
| 2002/0032613 A1 * | 3/2002 | Buettgenbach et al. | 705/26 |
| 2002/0046173 A1 * | 4/2002 | Kelly | 705/50 |
| 2002/0063157 A1 * | 5/2002 | Hara | 235/462.02 |

FOREIGN PATENT DOCUMENTS

| | | |
|---|---|---|
| EP | 0845747 | 6/1998 |
| JP | 9-330458 | 12/1972 |
| JP | 4-114891 | 4/1992 |
| JP | 10-091678 | 4/1998 |
| JP | 11-018916 | 1/1999 |

(Continued)

OTHER PUBLICATIONS

Japan Application 2001-176564 document art system and method for home delivery and collection, Kaneko Kikuo, filed on Dec. 6, 2001.*

(Continued)

*Primary Examiner*—Matthew S Gart
*Assistant Examiner*—Garcia Ade
(74) *Attorney, Agent, or Firm*—Ladas and Parry LLP

(57) ABSTRACT

Customers corresponding to a consignor sending a package and a consignee receiving the package install home delivery boxes at their homes, respectively. Information can be transmitted and received through a network between customer terminals and a terminal of a home delivery carrier delivering the package. In the manner described herein, even if the consignor and the consignee are not at their homes, the home delivery carrier can unlock the home delivery boxes by using a memory card to pick up the package from and put the package into the boxes.

8 Claims, 5 Drawing Sheets

FOREIGN PATENT DOCUMENTS

| | | |
|---|---|---|
| JP | 11-100107 | 4/1999 |
| JP | 2001-097513 | 4/2001 |
| JP | 2002-367029 | 12/2002 |
| JP | 2003-204863 | 7/2003 |
| WO | 0051750 | 9/2000 |
| WO | 0100069 | 1/2001 |
| WO | 0115579 | 3/2001 |
| WO | 0103530 | 5/2001 |
| WO | 0131588 | 5/2001 |
| WO | 0139638 | 6/2001 |

OTHER PUBLICATIONS

Patent Abstract of Japan of JP 4-114891 Dated Apr. 15, 1992.
Patent Abstract of Japan of JP 9-330458 Dated Dec. 22, 1972.
Patent Abstract of Japan of JP 11-100107 Dated Apr. 13, 1999.
Patent Abstract of Japan of JP 2001-097513 Dated Apr. 10, 2001.
Patent Abstract of Japan of JP JP 10-091678 Dated Apr. 10, 1998.
Patent Abstract of Japan of JP 11-018916 Dated Jan. 26, 1999.
Patent Abstract of Japan of JP 2002-367029 Dated Dec. 20, 2002.

\* cited by examiner

HOME DELIVERY BOX AND HOME DELIVERY BAGGAGE COLLECTING/DELIVERING SYSTEM AND METHOD THEREFOR

TECHNICAL FIELD

The present invention relates to a home delivery box and a home delivery package collecting/delivering system, and a method therefor, for collecting/delivering a package based on transmission/reception of information using a network such as the Internet.

BACKGROUND ART

Conventionally, in the case where a home delivery package consignor sends a package to a consignee by using a home delivery service, the consignor hands the package in such a manner that the consignor himself/herself brings the package to an agent of a home delivery carrier such as a convenience store or a branch office of the home delivery carrier, or calls a branch office of the home delivery carrier or the like so that a driver of a truck of the home delivery carrier comes to the consignor's home to pick up the package. After the picked-up package is delivered to a consolidating center by the driver of the truck so as to be sorted by the destination, the package is transported to a delivery center for the destination. Then, the package is delivered from the delivery center to the consignee's home by a driver of a truck of the home delivery carrier, who is in charge of delivery in the area, so as to be directly handed to the home delivery consignee.

In a conventional home delivery package collecting/delivering method, however, since a package is delivered by hand, the home delivery package consignor must stay home until a truck of a home delivery carrier arrives for the consignor's request for collection of the package. Therefore, there is a problem that time constraints are imposed on the consignor. On the other hand, from the viewpoint of the home delivery carrier, if the consignor is absent at the time when the delivery carrier arrives at the home delivery consignor's home to collect the package at the request of the consignor, the home delivery carrier not only goes to the consignor's home in vain but also must go to the consignor's home again for collecting the package. Therefore, there is a problem that delivery/collection efficiency is lowered.

Moreover, if the consignee is absent at the time when the home delivery carrier delivers the package to the home delivery consignee's home, the home delivery carrier not only goes to the consignee's home in vain but also must go to the consignee's home again for delivering the package. Therefore, there is a problem that delivery/collection efficiency is remarkably lowered. In principle, the home delivery consignee is not informed of the contents of the package in advance. Thus, at the delivery of an article ordered by mail through the Internet, for example, in the case where a wrong article is delivered in the absence of an addressed person, the others do not know whether the article is the one actually ordered or not. Therefore, there is a problem that a person other than the addressed person might pay for the article by cash on delivery, which is not actually needed. On the other hand, in the case where cash on delivery payment or delivery fee payment on delivery is refused, the home delivery carrier takes a long time in collecting the payment. Furthermore, there is a disadvantage in terms of crime prevention as follows. Since a package is normally delivered without any notices in advance, the consignee may open the door without any suspicions on arrival of the home delivery package. As a result, a thief pretending to be a delivery man may break into the house.

An object of the present invention is to provide a home delivery box and a home delivery package collecting/delivering system and a method therefor, in which the reliability and the efficiency of collection/delivery of a home delivery package are improved through transmission/reception of information by using a network such as the Internet.

The other object of the present invention is to provide a home delivery box and a home delivery package collecting/delivering system and a method therefor, which improve the convenience and the safety of a home delivery service user.

DISCLOSURE OF THE INVENTION

A home delivery package collecting/delivering system according to the present invention allows a home delivery carrier to collect and deliver a package from a home delivery consignor sending the package to a home delivery consignee receiving the package, based on transmission and reception of information via a network such as the Internet. The system includes: home delivery boxes used by customers, for storing the package therein, each home delivery box having a box door switchable between a locked state and an unlocked state by a lock; card readers respectively attached to the home delivery boxes, each reading information recorded on a first memory card used when the home delivery carrier picks up the package stored in the home delivery box and information recorded on a second memory card used when the home delivery carrier puts the package into the home delivery box; and customer terminals connected to a carrier terminal of the home delivery carrier via the network, for transmitting and receiving a signal between the respective card readers. In this configuration, it is characterized in that the first memory card is produced by a carrier terminal of a home delivery carrier to pick up the package from the home delivery box of the home delivery consignor, based on information output from the customer terminals; the second memory card is produced by a carrier terminal of a home delivery carrier to put the package into the home delivery box of the home delivery consignee, based on information output from the customer terminals; and the home delivery carrier unlocks the doors of the home delivery boxes by the first and second memory cards so as to pick up the package from and insert the package into the home delivery boxes.

In the present invention, if only the home delivery consignor sending the package puts the package into the home delivery box used by himself/herself, the home delivery carrier can operate the first memory card to pick up the package from the home delivery box. Moreover, the home delivery carrier can operate the second memory card to put the package into the home delivery box used by the home delivery consignee receiving the package. Therefore, even if the home delivery consignor and the home delivery consignee are absent, the package can be delivered and received without fail. A signal is transmitted and received between the card reader of the home delivery box and the customer terminal via a wire or wireless local area network.

The home delivery package collecting/delivering system of the present invention, is a system for collecting and delivering a package based on transmission and reception of information between home delivery consignor terminals and home delivery consignee terminals connected to the network such as the Internet, and the carrier terminals connected via a home delivery server connected to the network. In this configuration, it is characterized in that the home delivery server has a function of consulting a database where customer information regarding the home delivery consignors and the home delivery consignees is registered to retrieve an appropriate home delivery consignor terminal, home delivery consignee terminal and home delivery carrier terminal for each piece of information output from the home delivery consignor terminals and the home delivery consignee terminals so as to establish communication therebetween; a home delivery consignor box has: lock means for a box door of the home delivery consignor box when the package is stored therein; and unlock means for the box door when information written in the first memory card and information output from the home delivery consignor terminal and the home delivery consignee terminal are entirely or partially identical with each other as a result of comparing both information, whereas a home delivery consignee box has: unlock means for a box door of the home delivery consignee box when information written to the second memory card and the information output from the home delivery consignor terminal and the home delivery consignee terminal are entirely or partially identical with each other as a result of comparing both information; and lock means for the box door of the home delivery consignee box when the package is stored therein; and the carrier terminal writes all of or a part of the information output from the home delivery consignor terminals and the home delivery consignee terminals into the first memory card and the second memory card.

In the present invention, the reliability and the efficiency of collection and delivery of the home delivery are improved by transmission and reception of information using a network such as the Internet. Moreover, the convenience and the safety of a home delivery service user are enhanced.

Among the information output from a home delivery consignor terminal and a home delivery consignee terminal, the information output from the consignor terminal includes: addresses of a consignor and a consignee, their names, their telephone numbers, the contents of a package, specification of delivery fee payment by the consignor or delivery fee payment on delivery, and in some cases, the size or weight of the package, also a cash on delivery option of the package, and a consignor password, the information from the consignee terminal includes an address of a consignee, his name, telephone number, etc., reception approval information, a consignee password and the like.

In the case where the information written into the first memory card is identical with that written into the second memory card, it is apparent that a single memory card may be sufficient for use.

For the home delivery consignor box, the information output from the home delivery consignor terminal and information provided in a receipt tag attached to the package are compared with each other and when the identification of both information is confirmed, the box door is preferably locked by the lock means to ensure further reliability of the system.

For the home delivery consignee box, the information written on an invoice of the package at the carrier terminal and the information output from the home delivery consignee terminal and the home delivery consignor terminal are compared with each other for judgment and when identification of predetermined information is confirmed, the box door is preferably locked by the lock means to ensure further reliability of the system.

The lock means or the unlock means is constituted by, for example, a lock mechanism for electromagnetically locking or unlocking the box door with a switching circuit for performing an ON-OFF operation, a lock mechanism for controlling locking and unlocking of a dial lock with a stepping motor or the like which is operated by a signal based on the above judgment.

In the home delivery package collecting/delivering system of the present invention, the home delivery consignor terminal and/or the home delivery consignee terminal is/are a portable telephone(s) or a mobile terminal(s) such as a PHS or a PDA. Therefore, the transmission and reception of various information such as the delivery information or the reception approval information can be performed, for example, between the home delivery consignor terminal and the home delivery consignee terminal, or between the home delivery consignor terminal or the home delivery consignee terminal and the carrier terminal at any location. Therefore, since the geographical restriction is reduced to improve the convenience of a user of the system. In this case, the mobile terminal can communicate with a local area network to which the home delivery boxes are connected via the network.

The above-mentioned home delivery box, the home delivery consignor box or the home delivery consignee box in the home delivery package collecting/delivering system of the present invention may be attached to a front door of a dwelling unit so as to allow the package to be put into and picked up from the box, at the inside and outside of the front door. The above-mentioned customer terminal, the home delivery consignor terminal or the home delivery consignee terminal for transmitting and receiving a signal to and from the home delivery box, the home delivery consignor box or the home delivery consignee box, may transmit a signal from an additional device such as a fire alarm, an intrusion alarm, a call alarm in nursing care, the other malfunction warning devices, meter data displays for electric power, gas, water, or the like, to a predetermined receiver via the Internet. In this case, a fee can be charged to a user of the additional device.

In the home delivery package collecting/delivering system of the present invention, if the carrier terminal is a mobile terminal and includes position recognition means, for example, a GPS, capable of recognizing its traveling position, an optimal path for collecting and delivering the package is displayed on a screen of the mobile terminal as a map, based on positional information by the position recognition means and the customer information registered in the database of the home delivery server. The package can be efficiently collected and delivered even in an unfamiliar area to improve the operating efficiency of distribution of goods.

In the home delivery package collecting/delivering system of the present invention, in the case where the home delivery boxes independently have a network connecting function, and the home delivery consignor box and the home delivery consignee box are directly connected to the network without intervention of a local area network of the home delivery consignor terminal and the home delivery consignee terminal, the home delivery server is set to have the function of consulting the database where the customer information regarding the home delivery consignors and the home delivery consignees is registered, and retrieving any one of or both of the appropriate home delivery consignor terminal and home delivery consignor box, or any one of or both of the home delivery consignee terminal and the home delivery consignee box, and the carrier terminal for each piece of information output from the home delivery consignor terminal and the home delivery consignee terminal so as to establish communication therebetween. As a result, the system of the present invention has particularly increased convenience in the case where the home delivery consignor terminal and the home delivery consignee terminal are connected to a network independently of the home delivery consignor box and the home delivery consignee box connected to a network, and the home delivery consignor terminal and the home delivery consignee terminal are mobile terminals. Moreover, according to the system of the present invention, the position where the box is installed is not limited to a home delivery consignor's home or a home delivery consignee's home, and can be freely selected.

In the home delivery package collecting/delivering system of the present invention, in the case where carrier terminals are categorized into a terminal of a branch office in charge of the home delivery consignor and a terminal of a branch office in charge of the home delivery consignee respectively responding to the home delivery consignor and the home delivery consignee, the home delivery server has the function of consulting the database where the customer information regarding the home delivery consignor and the home delivery consignee is registered to retrieve the appropriate home delivery consignor terminal and home delivery consignee terminal, or the home delivery consignor box and the home delivery consignee box, and the terminal of the branch office in charge of the home delivery consignor and the terminal of the branch office in charge of the home delivery consignee for each piece of information output from the home delivery consignor terminal and the home delivery consignee terminal so as to establish communication therebetween. The terminal of the branch office in charge of the home delivery consignor writes all of or a part of the information output from the home delivery consignor terminal and the home delivery consignee terminal to the first memory card, whereas the terminal of the branch office in charge of the home delivery consignee writes all of or a part of the information output from the home delivery consignor terminal and the home delivery consignee terminal to the second memory card. As a result, since the carrier terminals are categorized into the terminal of the branch office in charge of the home delivery consignor and the terminal of the branch office in charge of the home delivery consignee, a more concrete form of usage of the present invention is constituted.

The terminal of the branch office in charge of the home delivery consignor writes the information into the first memory card, while the information is partially or entirely written on an invoice. On the other hand, the terminal of the branch office in charge of the home delivery consignee recognizes the package based on the result of comparison between the information output from the home delivery consignor terminal and the home delivery consignee terminal and the information of the invoice. Based on this recognition, it is preferred that the information is written into the second memory card so as to assure further reliability.

In the home delivery package collecting/delivering system of the present invention, in the case where the home delivery consignor box has a confirmation button, the lock means of the home delivery consignor box temporarily locks the box door (a locked state where the door can be unlocked by a key possessed by the home delivery consignor) when the package to which claim tag information is attached is stored in the home delivery consignor box. After pressing the confirmation button, the lock means fully locks the box door (a locked state where the door can be opened only with the first memory card) if the information output from the home consignor terminal is confirmed identical to the claim tag information by comparing them. As a result, the confirmation of the delivered package is ensured.

In the home delivery package collecting/delivering system of the present invention, in the case where the home delivery consignee box has means for measuring the package, for example, a measurement device for the size of the package, the lock means of the home delivery consignee box also collates the measurement information in comparison between the information written on the invoice of the package and the information output from the home delivery consignee terminal and the home delivery consignor terminal so as to lock the door of the home delivery consignee box when identification of predetermined information including the measurement information is confirmed. In this manner, the confirmation of the delivered package is ensured.

In the home delivery package collecting/delivering system of the present invention, the home delivery consignor box has means for measuring the package to determine a delivery fee of the package so that the home delivery consignor effectuates electronic payment if the consignor has determined the type of the delivery fee payment by checking a column for delivery fee payment by the consignor selected from columns for delivery fee payment by the consignor and for delivery fee payment on delivery in the information prespecified by the home delivery consignor. In this manner, the convenience of the home delivery carrier and the home delivery service users is intentionally obtained.

As such electronic payment means, there are means using the first memory card, for example, an IC card, means using a prepaid card, a credit card, a debit card or the like, or means using, for example, electronic money stored in a hard disk of a terminal, and the like.

In the home delivery package collecting/delivering system of the present invention, the home delivery consignee effectuates the electronic payment if the delivery fee of the package is indicated by checking the column for delivery fee payment on delivery in the home delivery consignee box. In this manner, the convenience of the home delivery carrier and the home delivery users is intentionally obtained. As such electronic payment means, there are means using the second memory card, for example, an IC card, means using a prepaid card, a credit card, a debit card or the like, or means using, for example, electronic money stored in a hard disk of a terminal, and the like.

A package collecting/delivering method of the present invention is a method for collecting and delivering a package based on transmission and reception of information between the home delivery consignor terminals and the home delivery consignee terminals connected to a network such as the Internet, and a home delivery carrier terminal connected via a home delivery server connected to the network. The method includes the steps of: locking a box door of a home delivery consignor box when the package is put into the home delivery consignor box while transmitting the information output from a home delivery consignor terminal to a home delivery consignee terminal and the home delivery carrier terminal so that information output from the home delivery consignee terminal in response to the received information is transmitted to the home delivery consignor terminal and the home delivery carrier terminal; writing all of or a part of the information output from the home delivery consignor terminal and the home delivery consignee terminal to the first memory card and the second memory card at the home delivery carrier terminal; comparing the information written to the first memory card and the information output from the home delivery consignor terminal and the home delivery consignee terminal with each other at the home delivery consignor box so that the box door is unlocked to allow the package to be picked up therefrom when both the information are entirely or partially identical; comparing the information written to the second memory card and the information output from the home delivery consignee terminal and the home delivery consignor terminal with each other at the home delivery consignee box so that the box door of the home delivery consignee box is unlocked to allow the package to be put therein when both the information are entirely or partially identical; and locking the box door after the package is put into the home delivery consignee box. In this manner, the reliability and the efficiency of the collection and delivery of a home delivery package are enhanced. At the same time, the convenience and the safety of home delivery service users are improved. As described above, in the case where the information written to the first memory card is identical with the information written to the second memory card, it is apparent that the use of only one memory card may be sufficient.

In the home delivery consignor box, when the information output from the home delivery consignor terminal and a claim tag attached to the package are compared with each other to confirm the identification of predetermined information, it is preferred to lock the box door by lock means so as to ensure further reliability of the system.

Moreover, in the home delivery consignee box, when the information written to the invoice of the package at the home delivery carrier terminal and the information output from the home delivery consignor terminal and the home delivery consignee terminal are compared with each other to confirm the identification of predetermined information, it is preferred to lock the box door by lock means so as to ensure further reliability of the system.

In the home delivery package collecting/delivering method of the present invention, in the case where the home delivery carrier terminals are categorized into a terminal of a branch office in charge of the home delivery consignor and a terminal of a branch office in charge of the home delivery consignee, respectively corresponding to the home delivery consignor and the home delivery consignee, the terminal of the branch office in charge of the home delivery consignor writes all of or a part of the information output from the home delivery consignor terminal and the home delivery consignee terminal to the first memory card, whereas the terminal of the branch office in charge of the home delivery consignee writes all of or a part of the information output from the home delivery consignor terminal and the home delivery consignee terminal to the second memory card. In this manner, a more specific method for realizing the home delivery package collection and delivery of the present invention is illustrated.

The terminal of the branch office in charge of the home delivery consignor writes the information to the first memory card while writing all of or a part of the information to the invoice. On the other hand, the terminal of the branch office in charge of the home delivery consignee authenticates the package based on the result of comparison between the information output from the home delivery consignor terminal and the home delivery consignee terminal and the information of the invoice with each other. Based on the authentication, the information is written to the second memory card. It is desirable to ensure further reliability in this manner.

A home delivery box of the present invention, including an openable/closable box door and a space for storing a package therein for use of a customer, includes: a customer terminal connected to a carrier terminal possessed by a home delivery carrier for transporting the package, via a network such as the Internet; lock/unlock means for bringing the box door into a locked state and an unlocked state; and a card reader for reading information recorded onto a memory card produced by the home delivery carrier terminal based on information output from the customer terminal to the home delivery carrier terminal. In this configuration, it is characterized in that the customer terminal compares the information read by the card reader and the information stored in the customer terminal with each other to output an unlock enabling signal to the lock/unlock means when it is determined that the memory card of the home delivery carrier is proper so that the home delivery carrier opens the box door to pick up the package from and put the package into the box.

According to the home delivery box of the present invention, in the case where the consignor sending a package to the consignee, the home delivery carrier delivering the package can pick up the package from the home delivery box without meeting the consignor to receive the package by hand. Moreover, in the case where the consignee receives the package, the home delivery carrier delivering the package can put the package into the home delivery box without meeting the consignee to deliver the package by hand. Since the home delivery carrier uses the memory card produced at the home delivery carrier terminal based on the information sent from the consignor terminal or the consignee terminal to unlock the box door of the home delivery box, even a customer or the home delivery carrier cannot produce a memory card without any permissions. Therefore, the home delivery box of the present invention has high safety not only with respect to a third party but also to the customers as well as to the home delivery carrier.

BEST MODE FOR CARRYING OUT THE INVENTION

An example of a home delivery package collecting/delivering system according to an embodiment of the present invention will be described with reference to the drawings. The system includes: a home delivery box for storing a package, installed in each dwelling unit or house; and a carrier terminal connected to the home delivery box via a network. A home delivery carrier picks up a package stored in a home delivery box of the consignor to transport the package to a home delivery box of the consignee. The home delivery box preinstalled in each dwelling unit or house serves as a home delivery consignor box when the home delivery box stores a package to be picked up therefrom whereas the home delivery box serves as a home delivery consignee box when the home delivery box stores a package brought therein. A home delivery consignor who sends a package and a home delivery consignee who receives the package subscribe to the system as customers. The home delivery box has a box door capable of opening and closing. It is preferred that the home delivery box is installed in the vicinity of a front door of a dwelling unit. The home delivery box may be attached to the front door of a dwelling unit so that a package is put into/picked up from the home delivery box at inside/outside of the front door.

The home delivery box has a lock for locking the box door. A customer who uses the home delivery box can freely open/close the box door by a key or an unlocking instruction from the terminal except for the case where the box door is fully locked. The home delivery carrier can open/close the box door by using a memory card.

Figure 1:
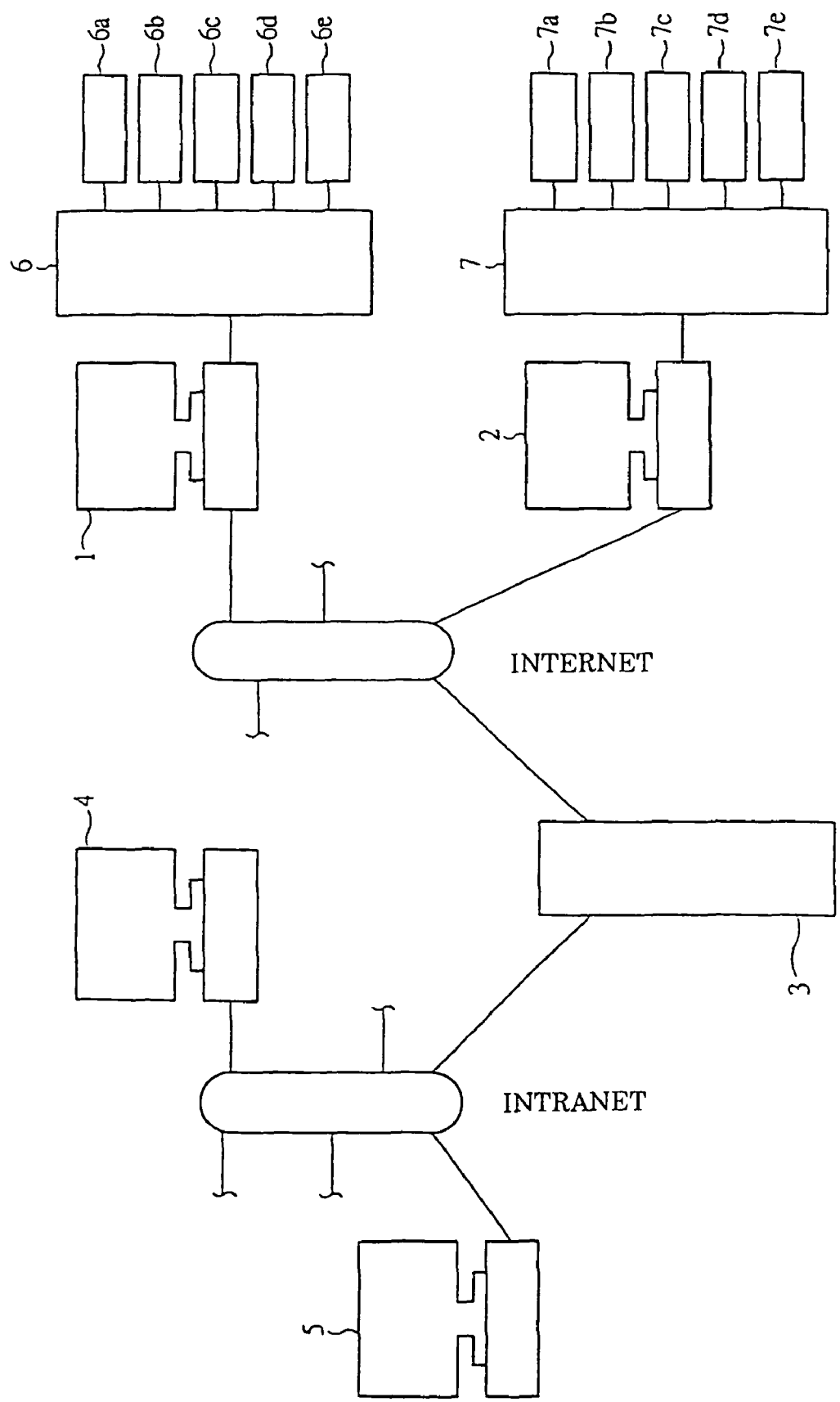
FIG. 1 is a view showing the configuration of a home delivery package collecting/delivering system according to one embodiment of the present invention.
Figure 2:
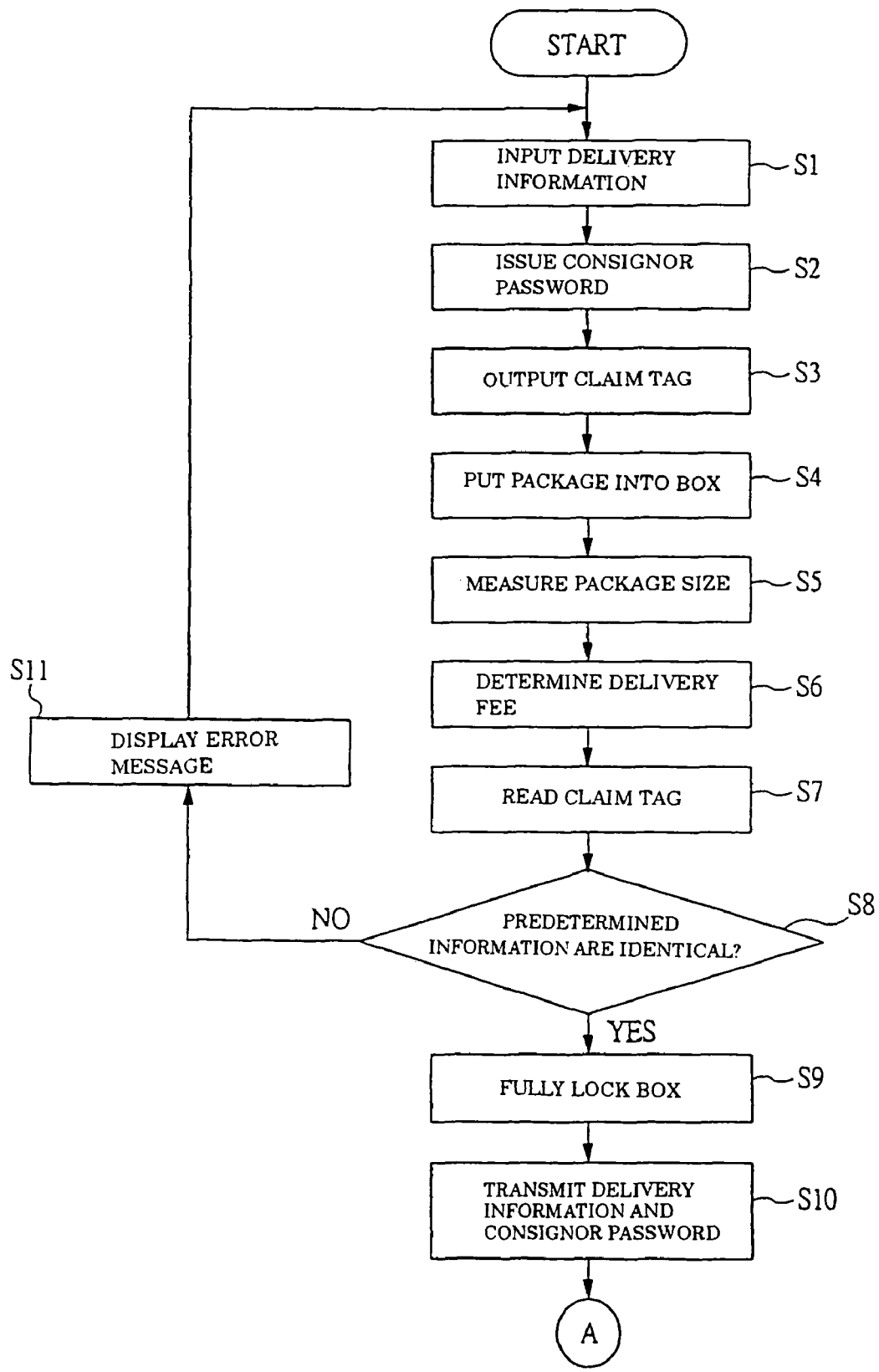
FIG. 2 is a flow chart of a home delivery package collecting/delivering method of the present invention.
Figure 3:
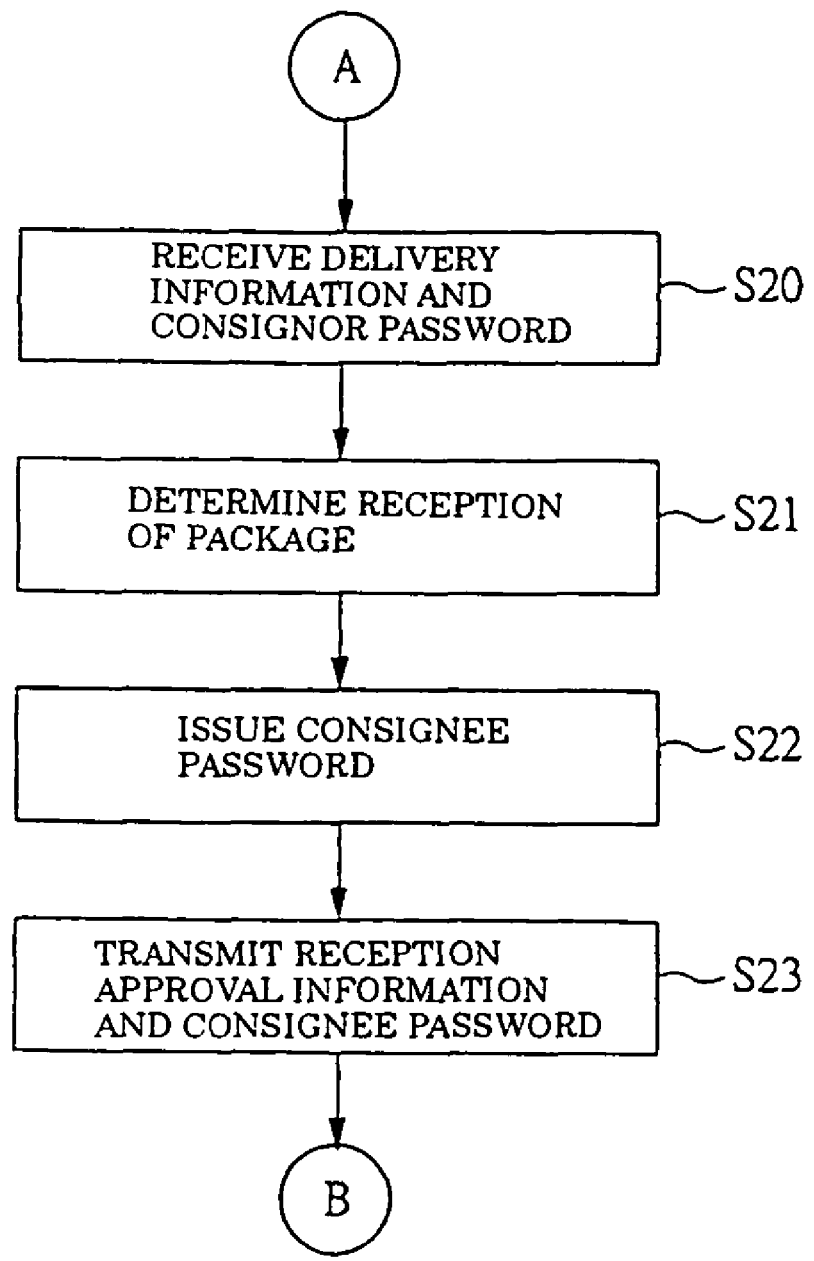
FIG. 3 is a flow chart of the home delivery package collecting/delivering method of the present invention.
Figure 4:
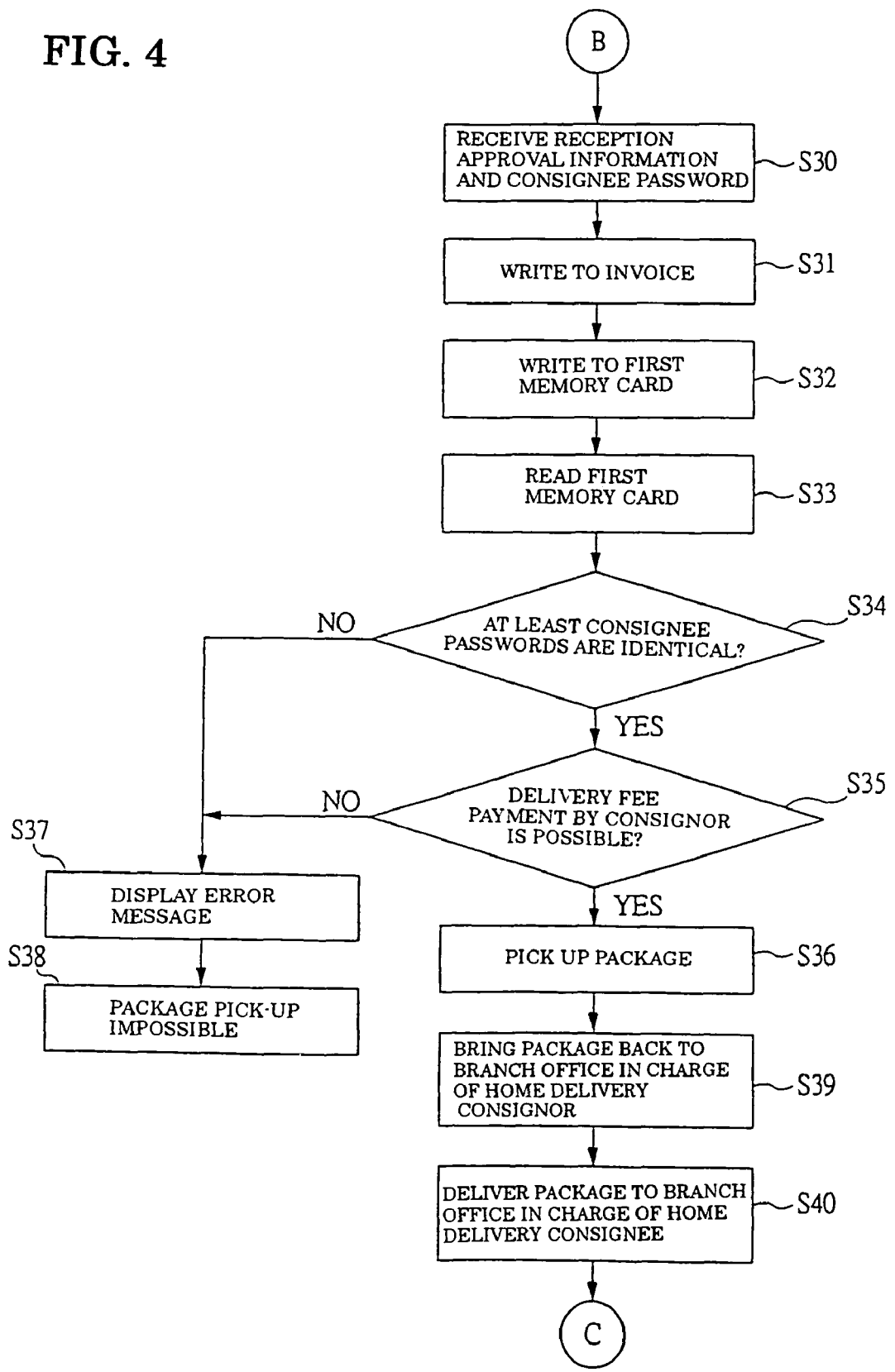
FIG. 4 is a flow chart of the home delivery package collecting/delivering method of the present invention.
Figure 5:
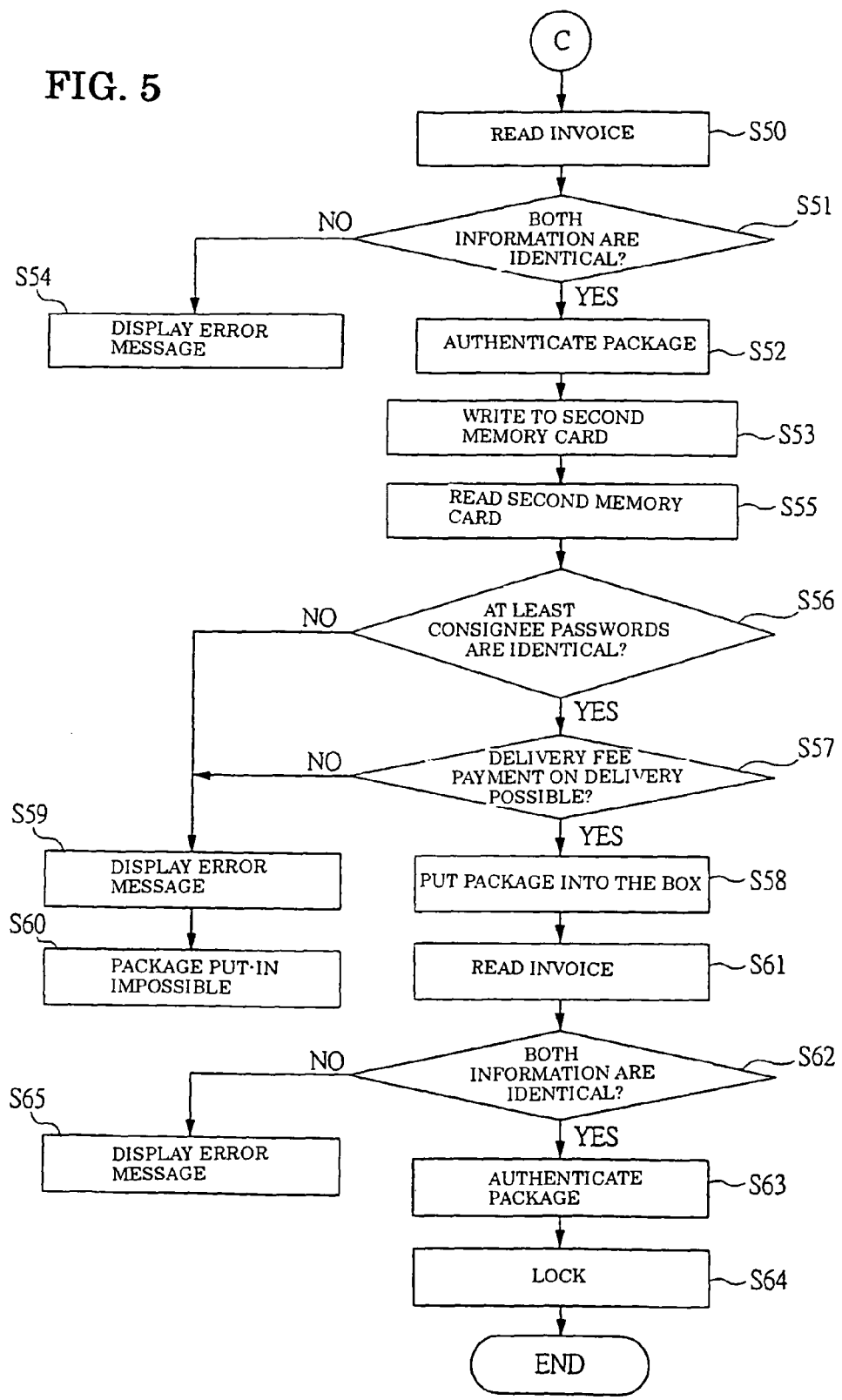
FIG. 5 is a flow chart of the home delivery package collecting/delivering method of the present invention.

As shown in FIG. 1, a home delivery package collecting/delivering system of the present invention, includes a home delivery consignor terminal 1 and a home delivery consignee terminal 2, each being connected to a network such as the Internet as a customer terminal. A terminal 4 of a branch office in charge of the home delivery consignor and a terminal 5 of a branch office in charge of the home delivery consignee, each serving as a home delivery carrier terminal, are connected to the network via a home delivery server 3. A package is collected and delivered based on the transmission/reception of information between the terminals. In the embodiment shown in FIG. 1, the home delivery consignor box 6 is linked to the network via the home delivery consignor terminal 1 by wired connection, whereas the home delivery consignee box 7 is linked to the network via the home delivery consignee terminal 2 by wired connection. The terminal 4 of the branch office in charge of the home delivery consignor, the terminal 5 of the branch office in change of the home delivery consignee, and the home delivery server 3 are connected to a local area network in the home delivery carrier.

The home delivery server 3 is set to have the following function. The home delivery server 3 consults a database in which customer information (for example, addresses, names, telephone numbers and the like) regarding the home delivery consignor and the home delivery consignee is registered to retrieve the appropriate home delivery consignor terminal 1, home delivery consignee terminal 2, terminal 4 of the branch office in charge of the home delivery consignor, and terminal 5 of the branch office in charge of the home delivery consignee for each piece of information output from the home delivery consignor terminal 1 and the home delivery consignee terminal 2 to establish communication therebetween.

A home delivery package collecting/delivering method using the system will be described with reference to flow charts shown in FIGS. 2 to 5 in addition to FIG. 1.

When the home delivery consignor corresponding to a sender of a package sends the package to the home delivery consignee, the home delivery consignor inputs delivery information such as the addresses of the consignor and the consignee, their names, their telephone numbers, the contents of the package, specification of delivery fee payment by the consignor or delivery fee payment on delivery, and in addition, the size of the package, and a cash on delivery option (step S1) to the home delivery consignor terminal 1. Then, a consignor password, which is, for example, effective only for the current transaction, is issued at the home delivery consignor terminal 1 (step S2). Furthermore, at the home delivery consignor terminal 1, the information is stored as a so-called original. At the same time, in this embodiment, a claim tag (a magnetic card or the like) containing duplicate key information for authenticating a real duplicate of the original (step S3) is output. The home delivery consignor attaches the claim tag to the package and then puts the package into the home delivery consignor box 6 (step S4). At this moment, the home delivery consignor box 6 is temporarily locked.

The above-mentioned duplicate key is an electronic mark or the like for demonstrating the function of a so-called "seal at the joining of two leaves" for assuring the claim tag information comes from the home delivery consignor terminal 1. The claim tag containing the duplicate key information serves to ensure that a package is the very package that the home delivery consignor sends. However, the claim tag may not contain the duplicate key information in some cases.

In the home delivery consignor box 6, when a confirmation button (not shown in the drawings) is pressed, the size of the package is measured by a measuring device (means for measuring the size of a package) 6a of the home delivery consignor box 6 (step S5). At this time, in the home delivery consignor box 6, a delivery fee is determined with reference to a prestored size-delivery fee table for a package (step S6). In the case where the delivery fee payment by the consignor is specified in the delivery information, the corresponding delivery fee is indicated in a column for payment by the consignor and in the case where the delivery fee payment on delivery is specified, the corresponding delivery fee is indicated in a column for payment on delivery. In the case where the delivery fee payment by the consignor is specified, electronic payment by the home delivery consignor may be effectuated using a prepaid card, a credit card, a debit card and the like. The electronic payment information is stored in, for example, the home delivery consignor terminal 1.

After the measurement of the package, data of the claim tag is read by a claim tag reader 6b of the home delivery consignor box 6 (step S7). At a next step S8, the original stored in the home delivery consignor terminal 1 and the duplicate of the claim tag containing the duplicate key information of the original are compared with each other. Once it is confirmed that both information contain identical predetermined information (for example, a part of the delivery information and the consignor password), a door of the box 6 is fully locked by lock means 6c (step S9). At this moment, the original of the claim tag containing the duplicate key information proving that the duplicate of the claim tag and the original form a pair is stored in the home delivery consignor terminal 1. Thereafter, the delivery information and the consignor password stored in the home delivery consignor terminal 1 are transmitted to the home delivery consignee terminal 2, the terminal 4 of the branch office in charge of the home delivery consignor, and the terminal 5 of the branch office in charge of the home delivery consignee (step S10). If it is determined that the information are not identical at the step S8, an error message is displayed (step S11) so as to repeat the procedure from the initial step.

If the electronic payment information is not stored in the home delivery consignor terminal 1 even though the delivery fee payment by the consignor is specified, the delivery information or the consignor password cannot be transmitted from the home delivery consignor terminal 1 so that the system may be unavailable from then on.

At the home delivery consignee terminal 2, the delivery information and the consignor password from the home delivery consignor terminal 1 are received (step S20). When it is determined that the package is received by the home delivery consignee (step S21), a consignee password, which is, for example, only effective for the current transaction, is issued (step S22). Then, reception approval information and the consignee password are transmitted to the home delivery consignor terminal 1, the terminal 4 of the branch office in charge of the home delivery consignor, and the terminal 5 of the branch office in charge of the home delivery consignee (step S23). At this time, if the delivery fee payment on delivery or cash on delivery is specified in the delivery information, electronic payment by the home delivery consignee may be effectuated using a prepaid card, a credit card, a debit card and the like. The electronic payment information is stored in, for example, the home delivery consignee terminal 2.

However, if the electronic payment information is not stored in the home delivery consignee terminal 2 even though the delivery fee payment on delivery or cash on delivery is specified, the reception approval information or the consignee password cannot be transmitted from the home delivery consignee terminal 2 so that the system may be unavailable from then on.

The terminal 4 of the branch office in charge of the home delivery consignor receives the reception approval information and the consignee password from the home delivery consignee terminal 2 (step S30). In addition to the reception approval information and the consignee password, the previously received delivery information and consignor password from the home delivery consignor terminal 1 are written into an invoice (a magnetic card or the like) (step S31). In this embodiment, at the same time, appropriate information containing the consignor password is written to a first memory card (step S32). A delivery man of the branch office in charge of the home delivery consignor goes to a consignor's home with the invoice and the first memory card. At this time, if the terminal 4 of the branch office in charge of the home delivery consignor is a mobile terminal including a GPS (position recognition means), the customer information of the home delivery server 3, that is, information of the location of the consignor's home is acquired to display an optimal route for delivery/collection of the package on a screen of the terminal 4 as a map. As a result, the delivery man can quickly arrive at the consignor's home. The delivery man first inserts the first memory card into a card reader 6d of the home delivery consignor box 6. In the home delivery consignor box 6, the information written into the first memory card is read (step S33). At a next step S34, the information written to the first memory card is compared with the delivery information and the consignor password stored in the home delivery consignor terminal 1, and the information output from the home delivery consignee terminal 2. If at least the consignor passwords are identical, a door of the box 6 is allowed to be unlocked by unlock means 6e so that the package can be picked up therefrom. In this embodiment, if the electronic payment for the delivery fee has not been effectuated yet, the package cannot be picked up from the box. In this case, it is apparent that the delivery fee is indicated in the column for delivery fee payment by the consignor in the first memory card at the step S32.

Specifically, both information are compared with each other for judgment as described above in the home delivery consignor box 6 (step S34). At the next step S35, the delivery fee (the delivery fee paid by the consignor) stored in the first memory card is compared with a balance of electronic money, stored in the home delivery consignor terminal 1. If at least the consignor passwords are identical and it is determined that "payment is possible," the delivery fee is charged to the first memory card to effectuate an electronic withdrawal from the balance of the consignor, thereby allowing the package to be picked up (step S36). The electronic payment information and the package pickup information are stored in the home delivery consignor terminal 1. Therefore, in the case where the information are not identical or it is determined that "payment is impossible," an appropriate error message or the like is displayed (step S37) so that the package cannot be picked up (step S38).

The delivery man labels the picked-up package with the invoice and brings it back with the first memory card to the branch office in charge of the home delivery consignor (step S39). After money transfer and the like is effectuated using the first memory card, the delivery man delivers the package labeled with the invoice to the branch office in charge of the home delivery consignee (step S40).

As described above, however, if the electronic payment has already been effectuated by a prepaid card, a credit card, a debit card or the like, the package can be picked up based on only the result of the comparison between both information for judgment at the step S34. Therefore, it is apparent that the payment through the first memory card is not required.

At the branch office in charge of the home delivery consignee, the information of the invoice is read at the terminal 5 of the branch office in charge of the home delivery consignee (step S50). At a next step S51, the information of the invoice is compared with the information from the home delivery consignor terminal 1 and the home delivery consignee terminal 2, which has been already stored in the terminal 5 of the branch office in charge of the home delivery consignee at the time of the delivery of the package. In this embodiment, if both information are identical, the package is authenticated (step S52) so as to write appropriate information containing the consignee password to the second memory card (step S53). However, if the information are not identical, an error message is displayed (step S54).

Thereafter, a delivery man of the branch office in charge of the home delivery consignee goes to a consignee's home with the package labeled with the invoice and the second memory card. At this time, if the terminal 5 of the branch office in charge of the home delivery consignee is a mobile terminal including a GPS (Global Positioning System), the customer information of the home delivery server 3, that is, information of the location of the consignee's home is acquired to display an optimal route for delivery/collection of the package on a screen of the terminal 5 as a map. As a result, the delivery man can quickly arrive at the consignee's home. The delivery man first inserts the second memory card into a card reader 7d of the home delivery consignee box 7. In the home delivery consignee box 7, the information written to the second memory card is read (step S55). At a next step S56, the information written to the second memory card is compared with the reception approval information and the consignee password stored in the home delivery consignee terminal 2, and the information output from the home delivery consignor terminal 1. If at least the consignor passwords are identical, a door of the box 7 is allowed to be unlocked by unlock means 7e so that the package can be put therein. In this embodiment, if the electronic payment for the delivery fee has not been effectuated by the second memory card, the package cannot be put into the box. In this case, it is apparent that the delivery fee is indicated in the column for delivery fee payment on delivery in the second memory card at the step S53.

Specifically, both information are compared with each other as described above in the home delivery consignee box 7 (step S56). Furthermore, at a next step S57, the delivery fee (the delivery fee to be paid on delivery) stored in the second memory card is compared with a balance of electronic money, stored in the home delivery consignee terminal 2. If at least the consignee passwords are identical and it is determined that "payment is possible," the delivery fee is charged to the second memory card to effectuate an electronic withdrawal from the balance, thereby allowing the package to be put into the box (step S58). The electronic payment information and package storage information are stored in the home delivery consignee terminal 2. However, in the case where the information are not identical or it is determined that "payment is impossible," an appropriate error message or the like is displayed (step S59) so that the package cannot be put into the box (step S60). In the case where cash on delivery is to be effectuated, the same procedure as that described for the case of the delivery fee (delivery fee to be paid on delivery) is performed.

As described above, however, if the electronic payment has already been effectuated by a prepaid card, a credit card, a debit card or the like or the electronic payment has already been effectuated by the first memory card, the package can be put into the box based on only the result of the comparison between both information at the step S56. Therefore, it is apparent that the electronic payment by the second memory card is not required.

When the delivery man puts the package into the home delivery consignee box 7 and presses a confirmation button (not shown in the drawings) of the box 7, the information of the invoice attached to the package is read by an invoice reader 7b of the box 7 (step S61). At a next step S62, the information of the invoice, the reception approval information and the consignee password stored in the home delivery consignee terminal 2, and the information from the home delivery consignor terminal 1 are compared with each other. In this embodiment, if both information are identical, it is authenticated that the package is the one whose delivery is requested by the consignor and whose reception is approved by the consignee (step S63) so that the door of the box 7 is locked by lock means 7c (step S64). At the same time, package reception information is stored in the home delivery consignee terminal 2. After locking at the step S64, it is desirable to set the lock means so that the door is not unlocked even by inserting the second memory card into the card reader 7d again. Moreover, in order to pick up the package from the box, it is conceivable that the home delivery consignee gives a predetermined unlocking instruction to the home delivery consignee terminal 2 or the home delivery consignee box 7. However, in the case where both information are not identical, an error message is displayed (step S65).

Then, after the delivery man brings back the second memory card to the branch office in charge of the home delivery consignee so as to effectuate the money transfer and the like, a delivery completion notice is transmitted to the home delivery consignor terminal 1, thereby completing a series of collection and delivery steps of the package.

When the confirmation button of the home delivery consignee box 7 is pressed, the size of a package may be measured by a measurement device (means for measuring the size of a package) 7a of the home delivery consignee box 7. In this manner, in the comparison described above, the collation of the result of the above measurement is added so as to further ensure the above-described authentication.

Moreover, it may not be when the second memory card is read but when the invoice is read that the delivery fee is charged to the second memory card to effectuate an withdrawal from the balance of the electronic money stored in the home delivery consignee terminal 2 and that the information of the invoice is authenticated by the above-mentioned comparison so as to lock the door of the box 7.

In the system according to this embodiment described above, the home delivery consignor and the home delivery consignee are described as so-called registered users of the system, that is, the information regarding the consignor and the consignee are registered in the database of the home delivery server 3. However, the system is also available to a person other than the registered users.

First, the case where the home delivery consignor is not a registered user but the home delivery consignee is a registered user will be described. However, the description of a part of the collection/delivery method, which is the same as that in the above-described case where the collection and delivery are performed between the registered users, is herein omitted.

Since the home delivery consignor is not a registered user in this case, the home delivery consignor must bring a package to the nearest branch office in charge of the home delivery consignor or the consignor must ask a delivery man to come home and pick up a package so as to directly hand the package. Then, at the branch office in charge of the home delivery consignor, delivery information such as addresses, names and telephone numbers of the consignor and the consignee, the contents of a package, and specification of delivery fee payment by the consignor or delivery fee payment on delivery, is input by using the terminal 4 of the branch office in charge of the home delivery consignor so as to issue a consignor password. Then, the delivery information and the consignor password are transmitted from the terminal 4 of the branch office in charge of the home delivery consignor to the home delivery consignee terminal 2 and the terminal 5 of the branch office in charge of the home delivery consignee. At the same time, the delivery information and the consignor password are stored as a so-called original at the terminal 4 of the branch office in charge of the home delivery consignor. On the other hand, a claim tag containing duplicate key information for proving that this information is a true duplicate of the original is output. The claim tag is attached to the package, whereas a copy of the original is handed to the home delivery consignor. At this time, if the delivery fee is paid by the consignor, the copy of the original also serves as a receipt. The package passed to the branch office in charge of the home delivery consignor is delivered from the branch office in charge of the home delivery consignor to the branch office in charge of the home delivery consignee in the same collecting/delivering method as that performed between the registered users. Then, after the package is stored in the home delivery consignee box 7 of the consignee, the door of the box 7 is locked through the above-described procedure. Thereafter, a delivery completion notice is sent by mail to the home delivery consignor, thereby completing a series of collecting/delivering steps of the package.

Next, the case where the home delivery consignor is a registered user but the home delivery consignee is not a registered user will be described. However, the description of a part of the collecting/delivering method, which is the same as that performed between the registered users, will be herein omitted.

The home delivery consignor inputs the delivery information such as the addresses, names and telephone numbers of the consignor and the consignee, and the consignor password to the home delivery consignor terminal 1 so as to transmit them to the terminal 4 of the branch office in charge of the home delivery consignor and the terminal 5 of the branch office in charge of the home delivery consignee. At the same time, the consignor stores the package in the home delivery consignor box 6 and fully lock the door of the box 6. However, although it is natural that the reception approval information as described above and the like is not sent from the consignee, it is proved through retrieval of the home delivery server 3 that the consignee is not a registered user. Therefore, even if such information is not sent, the procedure can proceed to the next delivery step. The package is picked up from the home delivery consignor box 6 by a delivery man of the branch office in charge of the home delivery consignor and delivered to the branch office in charge of the home delivery consignee by the same collecting/delivering method as that performed between the registered users. Then, the package is delivered to the home delivery consignee's home by the delivery man of the branch office in charge of the home delivery consignee so as to be directly handed to the home delivery consignee. At this time, if the delivery fee on delivery is paid, the completion of payment and a delivery completion notice are transmitted from the terminal 5 of the branch office in charge of the home delivery consignee to the home delivery consignor terminal 1 to complete a series of the collecting/delivering steps of the package.

The above-described embodiment describes that the local area network of a home delivery carrier, constituted by the terminal 4 of the branch office in charge of the home delivery consignor, the terminal 5 of the branch office in charge of the home delivery consignee and the like, is connected to a network such as the Internet to which the home delivery consignor terminal 1 and the home delivery consignee terminal 2 are connected. However, the home delivery consignor terminal 1 and the home delivery consignee terminal 2 may be connected to the local area network of the home delivery carrier via a private circuit.

The home delivery consignor terminal 1 and the home delivery consignee terminal 2 may be installed exclusively for the home delivery package collecting/delivering system. However, if such an environment has been already prepared as a personal computer or the like serving as a network terminal is connected to a network such as the Internet, the personal computer or the like serving as a network terminal can be used as a home delivery consignor terminal or a home delivery consignee terminal. Specifically, the measurement devices 6a and 7a to the unlock means 6e and 7e respectively provided in the home delivery consignor box 6 and the home delivery consignee box 7 serving as the home delivery boxes respectively transmit information to and receive information from the home delivery consignor terminal 1 and the home delivery consignee terminal 2 functioning as the customer terminals. The existing network terminal such as the above-mentioned personal computer may be considered as the home delivery consignor terminal 1 or the home delivery consignee terminal 2 so that a local area network may be constituted by network terminals such as personal computers and the respective home delivery boxes to transmit/receive the information.

The existing network terminal such as the personal computer is used in this manner, so that the cost for constructing the home delivery package collecting/delivering system can be held down. Since it is expected that a number of network terminals such as personal computers, connected to the network such as the Internet, steadily increases in the future, the availability of the system, in which the home delivery boxes are connected to the existing network terminals such as the personal computers via the local area network, is more and more increased.

Moreover, if various devices are connected to the network terminals such as the personal computers via the local area network in addition to the home delivery boxes, signals from an additional device such as a fire alarm, an intrusion alarm, a call alarm in nursing care, the other malfunction warning devices, meter data displays for electric power, gas, water or the like can be transmitted to a predetermined receiver. Therefore, a user of the additional device can be charged, thereby enhancing the profitability of the system.

When the local area network is to be constituted with the network terminals such as the personal computers, a wireless local area network (wireless LAN) having a high degree of freedom in installation is particularly excellent because the construction with the wireless LAN does not suffer from a wiring. In the case of the connection via the wireless LAN, the home delivery boxes can be placed at any location. Various additional devices can be placed at the optimal positions in accordance with their functions.

Furthermore, the terminals of the home delivery box users and the home delivery carrier are connected via the network such as the Internet. Thus, if the connection function to a specific information providing site is preset to the terminal of the home delivery carrier, the home delivery carrier can provide various information such as advertisement to the customers. Accordingly, an advertisement fee and the like can be charged to an information provider in accordance with the number of accesses to various information by customers using their own terminals. As a result, the profitability of the system can be further improved.

The combination of the home delivery package collecting/delivering system with a service provided by an additional device such as a fire alarm, an intrusion alarm, a call alarm in nursing care, the other malfunction warning devices, meter data displays for electric power, gas, water or the like, an information providing service or the like, is not a merely random combination. Each of the services demonstrates special effects only when it is combined with the home delivery package collecting/delivering system.

For example, information output from a fire alarm, an intrusion alarm, a call alarm in nursing care or the other malfunction warning devices is required to be quickly and personally dealt with. In combination of these alarm response services with the home delivery package collecting/delivering system, since a number of home delivery vehicles always run through a delivery area for the home delivery service and the number of home delivery vehicles per area is generally larger than that of patrol wagons of a security company specializing in security services, a driver of the nearest home delivery vehicle that receives information transmitted from the fire alarm, the intrusion alarm, the call alarm in nursing care or the other malfunction warning devices can quickly respond to the alarm which is to be personally dealt with. Even though the number of home delivery vehicles per area is larger than that of patrol wagons of the security company per area, the cost can be held down. Specifically, as the home delivery vehicle provides a collection and delivery service at the same time, the cost for the alarm response services provided by the home delivery vehicle is remarkably lower than the cost charged to the security company for increasing the number of patrol wagons specializing in security to have an equal area density to that of the home delivery vehicles. In addition, a rich service can be provided. Furthermore, since abnormal circumstances such as a fire or intrusion do not frequently happen, it is more reasonable to cope with the abnormal circumstances concurrently, than to make a precious person or object stand by for a rare situation by the security company specializing in security services. In a home delivery business, since the home delivery carrier concurrently provides an alarm response service and can be reliable in case of emergency, the reliability of the home delivery carrier is improved so that synergistic effects such as an increase in the number of orders of home delivery service and the like can be expected.

Furthermore, for an electric power company, a gas company, a water public service company or the like, its own meter man is not required owing to a meter data information service for electric power, gas, water or the like. In addition, it is possible to delegate an electric leakage check, a gas leakage inspection, a water leakage inspection or the like, which are required to be personally dealt with, to the home delivery carrier that always patrols the area. Furthermore, by using the electronic payment function of the home delivery package collecting/delivering system, it is also possible to delegate even the collection of a fee to the home delivery carrier.

Next, regarding the relation between a service for providing information to a user of the home delivery box and the home delivery package collecting/delivering system, a mail-order house on the network accompanied by distribution of goods is considered as the most potential information provider, that is, advertiser. Even in the transaction on the network, transactions such as financial transactions or marketing transactions, transactions of copyrighted works such as texts or computer softwares, images or music, which can be digitalized, can be achieved on the network except the cash delivery operation at the final payment. However, in the transaction of an object which has a mass in a physical sense, a process of distribution of an article for transporting the article from a point A to a point B is indispensable. Therefore, a mail-order house accompanied by distribution of articles needs means to quickly and correctly deliver an article to a consumer. On the other hand, since a consumer must stay home on the delivery day and at the delivery time of an article to receive the article, the consumer has a great interest in the delivery date and time of the article. Therefore, if the ordered article is delivered by the home delivery package collecting/delivering system of the present invention, the consumer is not bothered by the delivery date and time. Specifically, the mail-order house ties up with the home delivery carrier employing the home delivery package collecting/delivering system of the present invention so as to ensure delivery means which does not bother the customer about the delivery date and time and reduces the burden on the customer. As a result, an increase in number of orders is expected. For the home delivery carrier, the mail-order house as a stable consignor is surely kept. At the same time, a revenue in advertisement can be expected from an information providing service incorporated into the home delivery package collecting/delivering system.

A single system can provide multiple services because the realization of correct and efficient collection and delivery without any time constraints, which is a characteristic of the home delivery package collecting/delivering system of the present invention, allows a combination with various alarm response services without remarkably increasing the burden on the delivery man. The combination of the information providing service with the home delivery package collecting/delivering system can be realized by the synergistic effects, which can be obtained only in combination with the home delivery package collecting/delivering system of the present invention. Therefore, by carrying out the present invention, a larger revenue can be expected at a lower cost than in the case where the services are individually provided. The service is not limited to a home delivery service, but is also extended to a security service, a nursing care service, further to incorporate an information providing service so as to diversify and maximize an operating revenue.

Moreover, the application of the home delivery package collecting/delivering system according to the above-described embodiment is not limited to a domestic service but can also be extended to a multicountry service. As a result, the convenience is enhanced.

INDUSTRIAL AVAILABILITY

In the present invention, customers corresponding to a consignor sending a package and a consignee receiving the package install home delivery boxes at their homes so that a home delivery company can pick up the package from the home delivery box of the consignor. The home delivery company can also put the package into the home delivery box of the consignee. To unlock a box door of the home delivery box, the delivery man operates a memory card issued by a terminal of the home delivery carrier based on information output from a terminal of a customer. In this manner, even if the consignor and the consignee are absent, the home delivery carrier can unlock the home delivery box by using the memory card so as to pick up the package from and put the package into the box.

The invention claimed is:

1. A home delivery package collecting/delivering system allowing a home delivery carrier to collect and deliver a package from a home delivery consignor sending the package to a home delivery consignee receiving the package based on transmission and reception of information via a network, the home delivery package collecting/delivering system comprising:

home delivery boxes used by customers for storing the package therein, each home delivery box having a box door switchable between a locked state and an unlocked state by a lock;

card readers respectively provided for the home delivery boxes, each reading information recorded on a first memory card used when the home delivery carrier picks up the package stored in a home delivery box and information recorded on a second memory card used when the home delivery carrier puts the package into a home delivery box; and customer terminals connected to a home delivery carrier terminal of the home delivery carrier via the network, for transmitting and receiving a signal to and from the respective card readers, wherein the first memory card is produced by a carrier terminal of a home delivery carrier to pick up the package from the home delivery box of the home delivery consignor, based on information output from the customer terminals;

the second memory card is produced by a carrier terminal of a home delivery carrier to put the package into the home delivery box of the home delivery consignee, based on information output from the customer terminals; and the home delivery carrier unlocks the box doors of the home delivery boxes by the first and second memory cards so as to pick up the package from and put the package into the home delivery boxes;

and wherein a home delivery box of a customer serves as a home delivery consignor box when the home delivery box stores a package to be picked up therefrom and serves as a home delivery consignee box when the home delivery box stores a package brought thereto, wherein the first and second memory cards are produced by the carrier terminal or carrier terminals so as to include information transmitted from both the consignor and consignee via the network, and the first memory card includes at least a consignor password necessary to unlock the lock of the home delivery box of the consignor, and the second memory card includes at least consignee password necessary to unlock the lock of the home delivery box of the consignee.

2. The home delivery package collecting/delivering system according to claim 1, wherein the home delivery consignor terminal and/or the home delivery consignee terminal is/are a mobile terminal(s).

3. The home delivery package collecting/delivering system according to claim 1, wherein the home delivery box, the home delivery consignor box or the home delivery consignee box is attached to a front door of a dwelling unit so as to allow the package to be put into and picked up from the box at inside and outside of the front door.

4. The home delivery package collecting/delivering system according to claim 1, wherein, in the case where the home delivery consignor box and the home delivery consignee box are directly connected to the network, the function of the home delivery server is replaced by a function of consulting the database where the customer information regarding the home delivery consignors and the home delivery consignees is registered to appropriately retrieve any one of or both of the home delivery consignor terminal and home delivery consignor box, any one of or both of the home delivery consignee terminal and the home delivery consignee box, and the home delivery carrier terminal, for each piece of information output from the home delivery consignor terminal and the home delivery consignee terminal so as to establish communication therebetween.

5. The home delivery package collecting/delivering system according to claim 1, wherein, in the case where the home delivery carrier terminals are categorized into a terminal of a branch office in charge of the home delivery consignor and a terminal of a branch office in charge of the home delivery consignee respectively responding to the home delivery consignor and the home delivery consignee, the function of the home delivery server is replaced by a function of consulting the database where the customer information regarding the home delivery consignors and the home delivery consignees is registered to retrieve an appropriate home delivery consignor terminal and home delivery consignee terminal, or home delivery consignor box and home delivery consignee box, and terminal of the branch office in charge of the home delivery consignor and terminal of the branch office in charge of the home delivery consignee, for each piece of information output from the home delivery consignor terminal and the home delivery consignee terminal so as to establish communication therebetween; and the terminal of the branch office in charge of the home delivery consignor writes all of or a part of the information output from the home delivery consignor terminal and the home delivery consignee terminal to the first memory card, whereas the terminal of the branch office in charge of the home delivery consignee writes all of or a part of the information to the second memory card.

6. The home delivery package collecting/delivering system according to claim 1, wherein the home delivery consignor box has: means for measuring the package to determine a delivery fee of the package; and means for allowing the home delivery consignor to effectuate electronic payment if the consignor has determined the type of the delivery fee payment by checking a column for delivery fee payment by the consignor selected from columns for delivery fee payment by the consignor and for delivery fee payment on delivery, in the information prespecified by the home delivery consignor.

7. The home delivery package collecting/delivering system according to claim 1, wherein the home delivery consignee box has means for allowing the home delivery consignee to effectuate electronic payment when the delivery fee of the package is indicated by checking a column for delivery fee payment on delivery.

8. The home delivery package collecting/delivering system according to claim 1, wherein the first memory card is produced by the carrier terminal of the home delivery carrier and by written information including a consignor password to pick up the package from the home delivery box of the home delivery consignor, based on the information and the consignor password output from a home delivery consignor terminal of the home delivery consignor, being the customer terminal, and the second memory card is produced by the carrier terminal of the home delivery carrier and by written information including a consignee password to put the package into the home delivery box of the home delivery consignee, based on the information and the consignee password output from the home delivery consignee terminal of the home delivery consignee, being the customer terminal.

* * * * *